No. 689,293. Patented Dec. 17, 1901.
A. F. DIDOT.
MILK PAIL.
(Application filed Sept. 10, 1901.)
(No Model.)
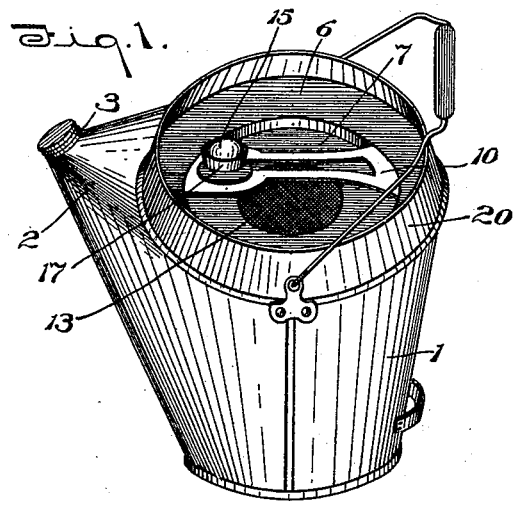
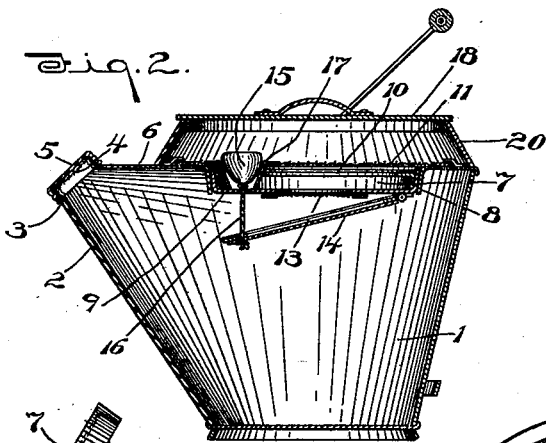
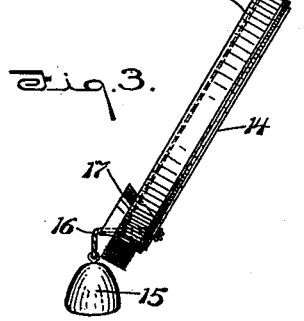
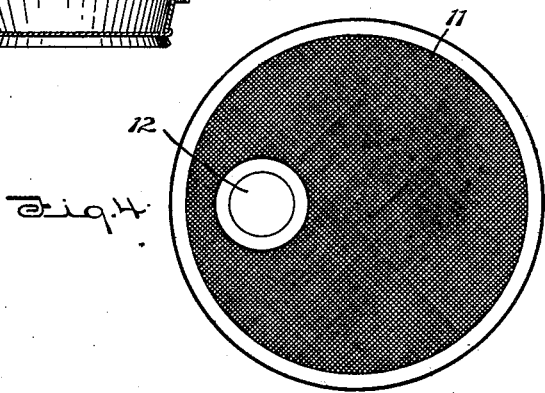
Witnesses:
George Oltsch
Hugo Oltsch
Armand F. Didot
Inventor
By Lehmann & Dalton
Attys.
THE NORRIS PETERS CO., PHOTO-LITHO., WASHINGTON, D. C.

UNITED STATES PATENT OFFICE.

ARMAND FERDINAND DIDOT, OF CANTON, MASSACHUSETTS.

MILK-PAIL.

SPECIFICATION forming part of Letters Patent No. 689,293, dated December 17, 1901.

Application filed September 10, 1901. Serial No. 74,888. (No model.)

*To all whom it may concern:*

Be it known that I, ARMAND FERDINAND DIDOT, a citizen of the United States, residing at Canton, in the county of Norfolk and State of Massachusetts, have invented certain new and useful Improvements in Milk-Pails; and I do hereby declare the following to be a full, clear, and exact description of the invention, such as will enable others skilled in the art to which it appertains to make and use the same.

My invention relates to improvements in milk-pails; and its object is to provide a simple and inexpensive article of this kind which will prevent the contents from spilling in case the pail should be accidentally upset; and to these ends it consists of a pail having a removable trap supported beneath the cover, strainers attached to the cover and the trap, a valve carried by the latter, and means connected with the valve to automatically close the same when the pail is tilted or upset.

Further objects and advantages of the invention will appear in the following description, and the novel details will be pointed out in the appended claims.

In the drawings, Figure 1 is a perspective view of the pail. Fig. 2 is a vertical longitudinal section of the pail embodying all of the features of my invention. Fig. 3 is a side elevation of the trap, showing how the valve is held closed when the pail is tilted. Fig. 4 is a top plan view of the upper strainer.

Like numerals of reference indicate corresponding parts in the different views.

The pail 1 is provided with a conical front 2, which terminates in a spout 3, provided with a screen or strainer 4 at its end and adapted to be closed by a suitable cap or cover 5, which screws upon the spout. The pail is provided with an internal annular ledge 6, secured to its top, which forms a central opening, in which the trap 7 is fitted, and the extreme edge of the annular ledge is bent downwardly to form a depending converging flange 8, against which the sides of the trap engage, as shown in Fig. 2. Any suitable means may be employed to removably secure the trap within the opening, so that the trap may not be displaced should the pail be accidentally upset.

The trap 7 is formed from a lower disk portion 9, the side edges of which are turned upwardly and rest against the inner edges of the depending flange 8. The trap is provided with a handle 10, fitted between the upwardly-projecting portions of the disk portion 9.

Upon the top of the annular flange is secured the strainer 11, provided with an opening 12 near one edge, the purpose of which will presently appear. In the bottom of the trap is formed a central opening 13, which is provided with a strainer, by means of which the milk is again strained before passing through the opening in the pail.

Upon the bottom of the trap is hinged a valve 14, which is connected to a weight 15 by means of a flexible connection 16, and which flexible connection and weight serve to automatically hold the valve closed when the pail is tilted and prevent the spilling of the contents. When the pail is in an upright position, the valve 14 is open, as shown in Fig. 2, and the weight is supported within its seat 17. This seat consists of a conical recess closed at its bottom by the lower disk 9 and in alinement with the opening 12 in the upper strainer 11, and when the pail is upset the weight will be easily dislodged from its seat, and since the play of the weight is not sufficient to allow the same to strike the cover or the ground it will draw tightly on the flexible connection and hold the valve closed as long as the pail is in an upset position, as shown in Fig. 3.

An annular upwardly-converging band 20 is secured to the top of the pail and serves to prevent the milk from splashing when the pail is being filled. The pail is provided with a suitable cover 18, which fits over the band 20.

It will be seen by the arrangement of the strainers, the valve, and the means for holding the valve closed that the milk is strained upon passing through the trap, and should the pail be accidentally overturned the valve will immediately close the opening in the trap and prevent the milk from spilling, and the weight 15 will also be dislodged from its seat and by means of the rope 16 tightly hold the valve closed. Since the play of the weight is not sufficient to allow it to contact with the ground, by being flexibly connected with the valve it will drop to one side, and thereby hold the valve closed as long as the pail is upset, whereas if the weight were allowed to extend beyond the upper edge of the pail it would be likely to engage some object and allow a slack in the flexible connection, which would result in the contents of the pail spilling through the top, as the valve would not be pulled tightly against its seat.

Having thus described my invention, what I claim, and desire to secure by Letters Patent, is—

1. In a milk-pail, the combination with a receptacle having an upwardly-converging band around its top and an internal annular ledge beneath said band which terminates in an annular depending flange, of a removable trap having an upstanding annular flange to engage the depending flange, a seat formed in the trap, a strainer supported on the annular ledge and provided with an opening in alinement with the seat, a valve hinged to the bottom of the trap, a weight normally supported in the seat and attached to the valve by a flexible connection, whereby the valve will be held closed when the weight is dislodged from its seat.

2. In a milk-pail, the combination with a receptacle having an internal annular ledge near its top, of a trap removably mounted within the opening formed by the annular ledge and provided with an upstanding conical seat and a central filling-orifice, a hinged valve to close said orifice, a weight supported in the seat, and a flexible connection between the weight and valve to adapt said valve to be held closed when the pail is upset, substantially as specified.

In testimony whereof I affix my signature in presence of two witnesses.

ARMAND FERDINAND DIDOT.

Witnesses:
HORACE D. SEAVEY,
JOHN J. HAVERTY.